UNITED STATES PATENT OFFICE.

OSCAR LOEW, OF WASHINGTON, DISTRICT OF COLUMBIA.

IMMUNIZING PREPARATIONS FROM BACILLUS PYOCYANEUS.

SPECIFICATION forming part of Letters Patent No. 633,867, dated September 26, 1899.

Application filed January 26, 1899. Serial No. 703,498. (No specimens.)

*To all whom it may concern:*

Be it known that I, OSCAR LOEW, a subject of the German Emperor, residing at Washington, District of Columbia, have invented certain new and useful Improvements in the Manufacture of Curing and Immunizing Preparations from Bacillus Pyocyaneus and others of a Like Nature; and I do hereby declare the following to be a full, clear, and exact description of the invention, such as will enable others skilled in the art to which it appertains to make and use the same.

My present invention relates to curative and immunizing preparations for infectious and contagious diseases.

It consists in a method of treating the cultures of *Bacillus pyocyaneus* and certain other related bacilli to obtain therefrom an enzyme solution purified and free of toxin. It further consists in certain other steps of treatment of said enzyme to provide the same in suitable form for subcutaneous or hypodermic injections. The invention thus contemplates extracting the curative properties of certain bacterial cultures and preparing the same in a concentrated and purified form as a solid and durable body, or, further, in combination with an animal protein, as presently described, and definitely set forth in the claims.

In certain bacterial cultures development gradually ceases notwithstanding the fact that a sufficient quantity of nourishing material is still present in the liquid. Different views have been expressed on this point; but I have ascertained that the true cause is the formation of a soluble ferment or enzyme, which becoming gradually more concentrated by its being continually secreted from the bacteria finally dissolves the bacteria themselves. One kind of enzyme may dissolve different kinds of bacteria. Thus I have observed that one cubic centimeter of the concentrated enzyme solution from *Bacillus pyocyaneus* dissolves millions of bacilli of anthrax, cholera, typhoid fever, diphtheria, and black plague very easily in twelve to twenty-four hours. The gonococcus and staphylococcus are also attacked. I have further ascertained that this dissolving process continues in the animal body itself—*e. g.*, if anthrax bacilli are first injected into a rabbit or other test animal and a solution of the enzyme is afterward injected at another part of the body it will be observed upon killing and dissecting the animal after a period of about twenty-four hours subsequent to injection that the bacilli which had penetrated into the liver and spleen have undergone more or less disintegration and dissolution. Thus anthrax in animals can readily be cured by injections of the concentrated enzyme of the *Bacillus pyocyaneus*. Observations that filtered cultures of *Bacillus pyocyaneus* can cure anthrax have also been made by Hüppe and by Bouchard; but these authors did not ascertain in what the curing property consisted, nor did they ever try to obtain it in a concentrated purified solution or in form of a dry powder, as I have succeeded in doing.

Formerly either fresh cultures of bacteria or also the filtrate therefrom, containing all the products of metabolism and the rest of the organic and anorganic bacterial nutrients, were subcutaneously injected for curative purposes, or, secondly, the serum of animals treated with certain kinds of bacteria. The first method is unsafe, as noxious compounds are often present among the products of metabolism, and it is inconvenient, as on account of the solution being highly diluted repeated injections are necessary. The latter method of applying the serum of animals which have been subjected to treatment requires a long time and much labor before the serum has acquired the necessary properties.

I have found that the anthrax bacilli exhibit all states of dissolution in the spleen and other organs of animals that were treated with the said enzyme solution after infection with anthrax. Thus far no such purified enzyme has been obtained free from toxical properties or free from an admixture of a toxin. Certain kinds of bacteria produce more toxin than enzyme, which at our present state of science are impossible to separate. My method of preparing non-poisonous enzyme from *Bacillus pyocyaneus* may also be applied with good results to obtain the enzyme from certain other bacteria.

The enzyme of the *Bacillus pyocyaneus* is soon destroyed in the animal body. Hence although it is well adapted for curing certain diseases it is not so well suited for immunization against these diseases unless the injections are continued for a long time. The immunization process requires above all the presence of a bactericidal substance in the body which is not so easily attacked by the destructive metabolism. As the larger portion of the enzyme of the *Bacillus pyocyaneus* is destroyed in the animal, only a small portion is enabled to combine with animal proteins, and forming thus a combination of a higher molecular order thereby acquires a higher power of resistance and is well protected against any destructive forces with which it may contact. I have found that such an immunizing compound can also be prepared "in vitro" by mixing fresh blood or fresh spleen or liver with the said concentrated enzyme solution and adding 0.1 to 0.3 per cent. caustic potash to bring on the chemical condensation between the two substances. In order to prevent coagulation of the blood, 0.2 to 0.5 per cent. potassium oxalate is added directly to the mixture. The preparation thus obtained can serve not only for curing but also for immunizing against anthrax and diphtheria.

The concentrated purified enzyme solution is prepared as follows: The cultures of a non-virulent variety of *Bacillus pyocyaneus*, developed for several weeks at 30° to 36° centigrade, are first filtered through Berkefeldt or Chamberland filters and then neutralized exactly and evaporated to one-tenth or even less of the original solution *in vacuo* at 22° to 36° centigrade. This concentrated solution is then subjected to a dialysis for twenty-four hours, whereby the products of metabolism, nutrient salts—as potassium phosphate, magnesium sulphate, and chloride of sodium—and the rest of the organic nutrient materials (peptone, sugar, asparagine, kreatine, and leucine) are removed by exosmosis and the enzyme remains almost wholly behind in the dialysator. From this concentrated and purified enzyme solution a very durable solid preparation may be obtained as follows: Five to ten per cent. sterilized dextrin is dissolved at the ordinary temperature in the said solution, and this is poured directly in absolute alcohol. Hereby the dextrin is precipitated simultaneously with the enzyme and surrounding this protects it from the noxious action of the alcohol. The precipitate thus obtained is separated from the alcohol and dried *in vacuo* or over sulphuric acid. It proved still of very powerful property four months after, curing anthrax easily by subcutaneous injections. In a similar way also the immunizing compound above mentioned may be obtained in a dry and durable form.

A product less durable but still of great value when freshly prepared can be obtained by direct precipitation with alcohol without applying the dextrin.

Having thus described my invention, I claim—

1. The herein-described method of treating cultures of *Bacillus pyocyaneus* to obtain a concentrated purified enzyme solution, which consists in subjecting the cultures obtained at a temperature of 30° to 36° centigrade to filtering, neutralizing the same, evaporating it *in vacuo*, at a temperature of 22° to 36° centigrade to one-tenth or less its original volume, and then subjecting the resulting concentrated solution to dialysis for a period of twenty-four hours, more or less, whereby the products of metabolism, nourishing salts and other nourishing organic material present, are removed by exosmosis, and the enzyme remains in pure state, substantially as hereinbefore set forth.

2. The herein-described method to obtain an antitoxical curative preparation from cultures of *Bacillus pyocyaneus*, which consists in developing the cultures at a temperature of 30° to 36° centigrade filtering the same and neutralizing the filtrate; then evaporating it *in vacuo* at a temperature of 22° to 36° centigrade to one-tenth or less, its original volume, subjecting the solution to suitable treatment to remove the diffusible organic materials present, and combining the remaining product, enzyme, with a protective medium whereby the same is rendered durable, substantially as and for the purpose set forth.

3. The herein-described method of treating cultures of *Bacillus pyocyaneus*, for the purpose set forth, which consists in developing the cultures of a non-virulent variety of *Bacillus pyocyaneus* to a temperature of 30° to 36° centigrade for a period of two to three weeks, filtering the liquid, neutralizing the same and then evaporating it *in vacuo*, at a low temperature to one-tenth or less its original volume; then subjecting the solution to suitable treatment to remove all the diffusible organic materials present, and combining it with an animal protein by means of a diluted solution of potassa, whereby a durable preparation is obtained, substantially as herein and for the purpose set forth.

4. The herein-described method of treating a concentrated and purified solution of enzyme for the purpose set forth, which consists in combining the proteids of fresh blood with the enzyme in solution, by means of caustic potassa, substantially in the manner hereinbefore set forth.

In testimony whereof I affix my signature in presence of two witnesses.

OSCAR LOEW.

Witnesses:
JAS. A. RICHMOND,
W. HILL.